(12) United States Patent
Kikukawa et al.

(10) Patent No.: US 6,465,070 B2
(45) Date of Patent: Oct. 15, 2002

(54) OPTICAL RECORDING MEDIUM

(75) Inventors: Takashi Kikukawa; Hajime Utsunomiya, both of Tokyo (JP)

(73) Assignee: TDK Corporation, Tokyo (JP)

( * ) Notice: Subject to any disclaimer, the term of this patent is extended or adjusted under 35 U.S.C. 154(b) by 78 days.

(21) Appl. No.: 09/760,847

(22) Filed: Jan. 17, 2001

(65) Prior Publication Data

US 2001/0009708 A1 Jul. 26, 2001

(30) Foreign Application Priority Data

Jan. 18, 2000 (JP) ........................................ 2000-009461

(51) Int. Cl.$^7$ ................................................. B32B 3/02
(52) U.S. Cl. ................. 428/64.1; 428/64.5; 430/270.13
(58) Field of Search ............................... 428/64.1, 64.4, 428/64.5, 64.6, 913; 430/270.13, 495.1, 945; 369/283, 288

(56) References Cited

U.S. PATENT DOCUMENTS 6,111,849 A  8/2000  Yoshinari et al.
6,125,101 A  9/2000  Kikukawa et al.
6,154,437 A  11/2000  Utsunomiya et al.
6,169,722 B1  1/2001  Kikukawa et al.
2002/0021594 A1 *  2/2002  Nakamura .................. 365/200

FOREIGN PATENT DOCUMENTS

JP   8-267926   10/1996
JP   9-7176     1/1997

* cited by examiner

Primary Examiner—Elizabeth Mulvaney
(74) Attorney, Agent, or Firm—Oblon, Spivak, McClelland, Maier & Neustadt, P.C.

(57) ABSTRACT

High temperature reliability, and in particular, the high temperature reliability after repeated overwriting operations is improved in an optical recording medium wherein a material of Ag—In—Sb—Te system is used for the recording layer. Provided is an optical recording medium having a recording layer of phase change type, wherein said recording layer contains Ag, In, Sb, and Te as its main components, and Ge as its sub-component such that, when molar ratio of the elements constituting the main and sub-components is represented by formula (I): $(Ag_a In_b Sb_c Te_d)_{(1-e/100)} Ge_e$, $2 \leq a \leq 20$, $2 \leq b \leq 20$, $35 \leq c \leq 80$, $8 \leq d \leq 40$, $a+b+c+d=100$, and $1 \leq e \leq 15$.

4 Claims, 7 Drawing Sheets

RECORDING/READING BEAM

RECORDING/READING BEAM

FIG. 7

RECORDING/READING BEAM

FIG. 8

OPTICAL RECORDING MEDIUM

BACKGROUND OF THE INVENTION

1. Field of the Invention

This invention relates to an optical recording medium.

2. Prior Art

Highlight is recently focused on optical recording media capable of recording information at a high density and erasing the recorded information for overwriting. One typical overwritable optical recording medium is phase change optical recording medium wherein the recording layer is irradiated with a laser beam to change its crystalline state whereupon a change in reflectivity by the crystallographic change is detected for reading of the information. The phase change optical recording media are of great interest since the medium can be overwritten by modulating the intensity of a single laser beam and the optical system of the drive unit is simple as compared to magnetooptical recording media.

When information is recorded on the optical recording medium of phase change type, the entire recording layer is first brought into crystalline state, and then, a laser beam of high power (recording power) is applied so that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallization temperature and lower than the melting temperature. The record mark to which the laser beam of erasing power is applied is heated to a temperature higher than the crystallization temperature and then allowed to slowly cool to recover the crystalline state. Accordingly, in the optical recording media of the phase change type, the medium can be overwritten by modulating the intensity of a single light beam.

The recording layer of phase change type is most often constituted from chalcogenide systems such as Ge—Sb—Te system and Ag—In—Sb—Te system which provide a substantial difference in reflectivity between crystalline and amorphous states and have a relatively stable amorphous state.

The materials of Ag—In—Sb—Te system have the merit that signal output is high compared to the materials of Ge—Sb—Te system. Accordingly, the materials of Ag—In—Sb—Te system are highly promising for use as a material in the high density recording wherein the recording at exceedingly higher density is sought.

SUMMARY OF THE INVENTION

In the experiments of the inventors of the present invention, however, the materials of Ag—In—Sb—Te system were found to exhibit higher susceptibility to crystallization of record marks when stored in high temperature environment compared to the materials of Ge—Sb—Te system, namely, to suffer from poor high temperature reliability. It has been also found that the high temperature reliability of the materials of Ag—In—Sb—Te system further decreases with the increase in the number of overwriting operations.

In view of such situation, an object of the present invention is to improve the high temperature reliability, and in particular, the high temperature reliability after repeated overwriting operations of the optical recording medium wherein materials of Ag—In—Sb—Te system is used for the recording layer.

Such objects are attained by the present invention as described in (1) to (4), below.

(1) An optical recording medium having a recording layer of phase change type, wherein said recording layer contains Ag, In, Sb, and Te as its main components, and Ge as its sub-component such that, when molar ratio of the elements constituting the main and sub-components is represented by formula (I):

$$(Ag_a In_b Sb_c Te_d)_{(1-e/100)} Ge_e \qquad (I)$$

$2 \leq a \leq 20$,
$2 \leq b \leq 20$,
$35 \leq c \leq 80$,
$8 \leq d \leq 40$,
$a+b+c+d=100$, and
$1 \leq e \leq 15$.

(2) The optical recording medium according to the above (1) wherein $e \geq 1.8$.

(3) The optical recording medium according to the above (1) or (2) wherein $e \leq 8$.

(4) The optical recording medium according to any one of above (1) to (3) wherein $58 \leq c \leq 80$.

DETAILED DESCRIPTION OF THE INVENTION

The inventors of the present invention have found that the high temperature reliability can be remarkably improved by incorporating 1 mole % or more of Ge in the recording layer comprising the material of Ag—In—Sb—Te system, and that a high temperature reliability of sufficient level is retained after considerable number of repeated overwriting operations when the Ge content is 1.8 mole % or more, and in particular, when the Ge content is at least 2.0 mole %. Such increase in high temperature reliability is realized since addition of Ge results in the simultaneous improvement of the crystallization temperature and the activation energy of the recording layer, which leads to the improvement of thermal stability of the amorphous phase.

In addition, the inventors of the present invention have found that adjustment of crystal transition rate can be realized while maintaining the high temperature reliability by controlling the molar ratio of the elements constituting the main components and the Ge content.

The crystal transition rate is the speed at which the amorphous phase transforms into the crystalline phase, and this rate is an important parameter when amorphous record mark is to be erased (crystallized). In the phase change medium, amorphous record marks are crystallized when the record marks as described above are irradiated with the light beam of erasing power. When the record marks are to be crystallized, the temperature to which the medium is elevated as well as the time of heating by the light beam of erasing power should be controlled depending on the crystalline transition rate. For example, the time of heating depends on the linear velocity of the medium, and the time of heating is reduced at a higher linear velocity, and a recording layer having high crystal transition rate is required when the medium is used at a high linear velocity. However, the erasure is still possible when the recording layer having a high crystal transition rate is combined with low linear velocity. Therefore, a recording layer having a high crystal transition rate is necessary when a wide range of linear velocity is used.

On the other hand, irradiation of the recording layer with the light beam of recording power results in the melting of the recording layer. Amorphous record marks are formed when the subsequent cooling rate is quick, and crystallization takes place when the cooling rate is slow. Therefore, control of the cooling rate after the irradiation with the light beam of recording power is necessary in the formation of record marks. The cooling rate greatly depends on the linear velocity of the medium as well as the recording pulse strategy as will be described below, and for example, when the linear velocity is high, the cooling rate is also increased to enable formation of the record marks. However, even when the linear velocity is low, cooling rate can be increased by controlling the recording pulse strategy and margin of the linear velocity in the recording is relatively wide.

As evident from the above description, when the recording layer has a high crystal transition rate, erasure and recording can be accomplished irrespective of whether the linear velocity of the medium is fast or slow. In other words, when the recording layer has a high crystal transition rate, the margin of the linear velocity will be wide. Therefore, the recording layer may preferably have a high crystal transition rate.

However, increase in the crystal transition rate is associated with the problems as described below. For example, increase in the molar ratio of Sb in the main components is known to be associated with the increase in the crystal transition rate. However, such increase in the Sb molar ratio is also associated with the decrease in activation energy of the recording layer, and hence, with higher susceptibility to crystallization of the amorphous record marks. The high temperature reliability is thus impaired.

In contrast, even if Sb content in the main components were increased, reduction in the high temperature reliability induced by the increase of the Sb content can be significantly suppressed if Ge is incorporated as a sub-component in accordance with the present invention. However, the Sb content should also be increased in correspondence with the Ge addition since the Ge added counteracts the effect of the crystal transition rate improvement realized by the increase of the Sb content to some extent. The high temperature reliability is not impaired by such further increase of the Sb as long as Ge is incorporated.

It should be noted that the prevention by Ge of the reduction of the high temperature reliability associated with the increase in the Sb content is a finding which the inventors of the present invention have for the first time found out.

As described above, in the recording layer of Ag—In—Sb—Te system, the high temperature reliability is increasingly impaired with the increase in the number of overwriting operations. That is, the crystallization of the record marks in the high temperature storage is more likely to be promoted when the medium has experienced larger number of overwriting operations. This is also a finding which the inventors of the present invention have for the first time found out. In the present invention, the marked reduction in the high temperature reliability with the increase in number of overwriting operations can be substantially completely suppressed by increasing the amount of Ge incorporated.

Japanese Patent Application Laid-Open No. (JP-A) 267926/1996 describes a recording layer comprising a material of Ag—In—Sb—Te system wherein at least one of Si, Ge, Sn and Pb has been added as an additional element. In other words, addition of Ge to the material of Ag—In—Sb—Te system is already proposed. However, it has remained unknown that addition of Ge results in the improvement of the crystallization temperature and the activation energy of the recording layer, and it has been utterly unknown that the problem of the reduction in the high temperature reliability with increase in the number of overwriting operations can be notably obviated by incorporating Ge at an amount of at least 1.8 mole %, and in particular, at least 2.0 mole %.

JP-A 267926/1996 discloses that improvement of the crystal transition rate can be attained with no reduction in the activation energy of the recording layer by the incorporation of the additional element. In Example 1 of JP-A 267926/1996, a sample of optical recording disk is produce by using Si for the additional element. In this sample, the composition of the recording layer is:

wherein
  a=0.123,
  b=0.544,
  c=0.333,
  d=0.05, and
  e=0.017.

In Comparative Example 1 of JP-A267926/1996, a sample wherein "e" is 0 is produced for comparative purpose. In the sample of Example, Si content is 1.7 mole %, and Sb content in the main components (Ag+In+Sb+Te) is 51.7 mole %. In this example, the maximum overwritable linear velocity is 2.8 m/s when no Si is added and 12 m/s when Si is added at 1.7 mole %, and the crystal transition rate is improved by the addition of Si. In this Example, a single signal of 3.38 MHz (record mark length, 1.8 μm) is recorded at a linear velocity of 12 m/s in the sample wherein Si has been added at 1.7 mole %, and the sample is stored under the conditions of 80° C. and 80% RH to evaluate the deterioration of C/N. There is described that degradation in C/N was not recognized in this sample for over 5000 hours.

As described above, JP-A 267926/1996 does not disclose unique action of Ge in improving the high temperature reliability in spite of its disclosure of additional elements including Ge. In addition, proportion of Sb in the main components is relatively low in the Example of JP-A 267926/1996, and accordingly, it is conceived that the high temperature reliability should be relatively fair.

It should be noted that the method adopted in the present invention for evaluating the high temperature stability is different from the one used in Examples of JP-A 267926/1996. More specifically, the high temperature stability is evaluated in the present invention not by the C/N of the single signal but by jitter properties of a mixed signal including a plurality of signals. Such method is adopted because final error properties in the signal read out is in good correlation with the jitter properties of the mixed signal. In the evaluation by jitter properties, Ge among Si, Ge, Sn, and Pb exhibits unique action with regard to the high temperature reliability.

PREFERRED EMBODIMENT OF THE INVENTION

The phase change type recording layer of the optical recording medium according to the present invention contains Ag, In, Sb and Te as the main components, and Ge as the sub-component. When the atomic ratio of the main components is represented by the formula (I):

$$(Ag_a In_b Sb_c Te_d)_{(1-e/100)} Ge_e \quad (I)$$

a, b, c, d, and e are preferably in the range of:

$2 \leq a \leq 20$,
$2 \leq b \leq 20$,
$35 \leq c \leq 80$,
$8 \leq d \leq 40$,
$a+b+c+d=100$, and
$1 \leq e \leq 15$.

If the value of e representing the Ge content is less than 1 in formula (I), the effect of improving the high temperature stability will be insufficient. In order to improve the thermal stability of the record marks formed in the area experiencing repeated overwriting, e is preferably at least 1.8, and most preferably at least 2.0. On the other hand, when e is in excess of 15, the medium will exhibit poor initial jitter property, and sufficient jitter property can not be achieved before the high temperature storage. It should be noted that e is preferably up to 8 when the initial jitter property is to be further improved.

If the value of a is too small in formula (I), recrystallization of the record marks, and hence, repetitive overwriting will become difficult. In contrast, if the value of a is too large, excess Ag will solely diffuse into the Sb phase during the recording and erasure. This results in a reduced overwriting durability, less stability of both the record marks and the crystalline regions, and loss of reliability. Specifically, when the medium is stored at an elevated temperature, crystallization of the record marks will be promoted to invite drops of jitter and degree of modulation. In addition, the medium will undergo faster degradation in jitter and modulation degree in the repeated recording operations.

If the value of b is too small in formula (I), the record marks will become less amorphous to result in reduced degree of modulation and insufficient reliability. If the value of b is too large, reflectivity of the regions other than the record marks will become reduced and the degree of modulation will be reduced.

If the value of c is too small in formula (I), difference in the reflectivity created by the phase change will be sufficient, but erasure will be difficult due to markedly reduced rate of crystal transition. If the value of c is too large, the reflectivity difference created by the phase change will be insufficient to invite drop in the degree of modulation.

If the value of d is too small, the recording layer will be difficult to render amorphous, and signal recording may become impossible. If the value of d is too large, crystal transition rate will be excessively low to render the erasure difficult.

When the proportion of Sb is increased in the main components, increase in the crystal transition rate can be attained as described above. Decrease in the high temperature stability associated with the increase in the proportion of Sb can be substantially suppressed by the addition of Ge. However, addition of Ge suppresses improvement of the crystal transition rate by the addition of Sb to some degree, and therefore, amount of the Sb added should be increased in correspondence with the addition of the Ge. Addition of Ge in the present invention is particularly effective when the amount of Sb is increased, when the content of Sb expressed by c is in the range of 58 to 80.

The recording layer may optionally contain elements other than the main components and the sub-components as described above. Such additional elements may be at least one element selected from H, Si, C, V, W, Ta, Zn, Ti, Ce, Tb, Sn, Pb and Y. The additional element is effective for improving overwriting durability, and more specifically, for preventing loss of erasability as a result of repetitive overwriting operations. Of the elements as mentioned above, inclusion of at least one member selected from V, Ta, Ce, and Y is preferred because the effects are more outstanding. Content of the additional element in the recording layer is preferably up to 10 mole %. When the content of the additional element is too high, the reflectivity difference created by the phase change will be reduced to invite insufficient degree of modulation.

The recording layer preferably consists essentially of the elements as described above. However, it is acceptable that Ag is partially replaced by Au; Sb is partially replaced by Bi; Te is partially replaced by Se; and In is partially replaced by Al and/or P.

The percent replacement of Ag by Au is preferably up to 50 mole %, and more preferably up to 20 mole %. When the percent replacement is too high, the record marks are likely to crystallize, and loss of reliability at elevated temperature is invited.

The percent replacement of Sb by Bi is preferably up to 50 mole %, and more preferably up to 20 mole %. When the percent replacement is too high, the recording layer will have an increased absorption coefficient, and the optical interference effect will be reduced. This results in reduced difference in reflectivity between the crystalline region and the amorphous region, and hence, in reduced degree of modulation as well as in the difficulty of realizing a high C/N.

The percent replacement of Te by Se is preferably up to 50 mole %, and more preferably up to 20 mole %. When the percent replacement is too high, crystal transition rate will be too slow and the erasability will be insufficient.

The percent replacement of In by Al and/or P is preferably up to 40 mole %, and more preferably up to 20 mole %. When the percent replacement is too high, record marks will become less stable to result in the loss of reliability. The proportion of Al and P is arbitrary.

The recording layer is preferably formed to a thickness of 9.5 to 50 nm, and more preferably, to a thickness of 13 to 30 nm. When the recording layer is too thin, growth of the crystalline phase will be difficult and the reflectivity difference created by the phase change will be insufficient. When the recording layer is too thick, the recording layer will have an increased heat capacity to render the recording difficult. An excessively thick recording layer also results in the reduced reflectivity and in the reduced degree of modulation.

The composition of the recording layer may be identified by electron probe microanalysis (EPMA), X-ray microanalysis, ICP, etc.

The recording layer is preferably formed by sputtering. The sputtering conditions are not particularly limited. For example, when a recording layer comprising a material including two or more elements are to be formed, the sputtering may be conducted by using an alloy target, or alternatively, by multi-target sputtering wherein two or more targets are used.

In the present invention, the optical recording medium is limited only by the composition of the recording layer. In other words, the medium is not particularly limited for its structure.

Figure 6:
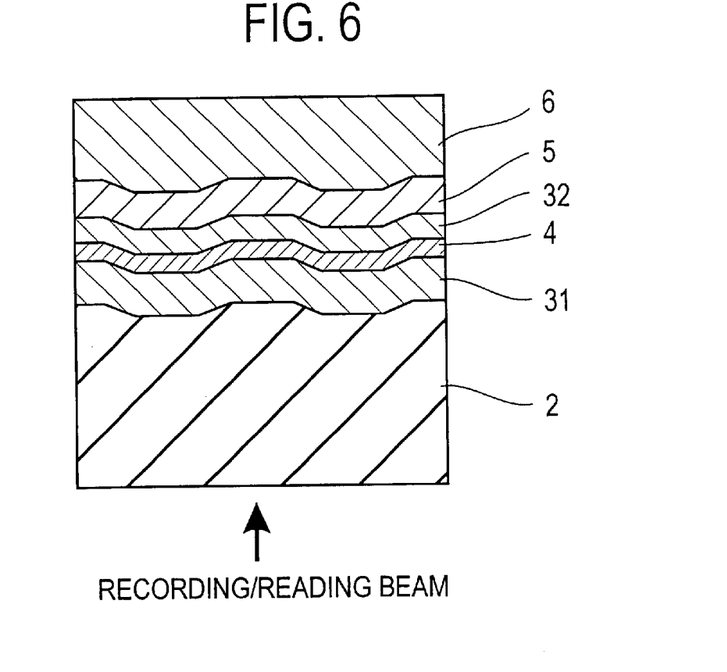
FIG. 6 is a cross sectional view of the optical recording medium according to an embodiment of the present invention.

A typical embodiment of the optical recording medium of phase change type comprises a substrate 2; and a first dielectric layer 31, a recording layer 4, a second dielectric layer 32, a reflective layer 5, and a protective layer 6 disposed on the substrate 2 in this order as shown in FIG. 6. In the medium of such embodiment, the recording/reading beam is irradiated through the substrate 2.

Figure 7:
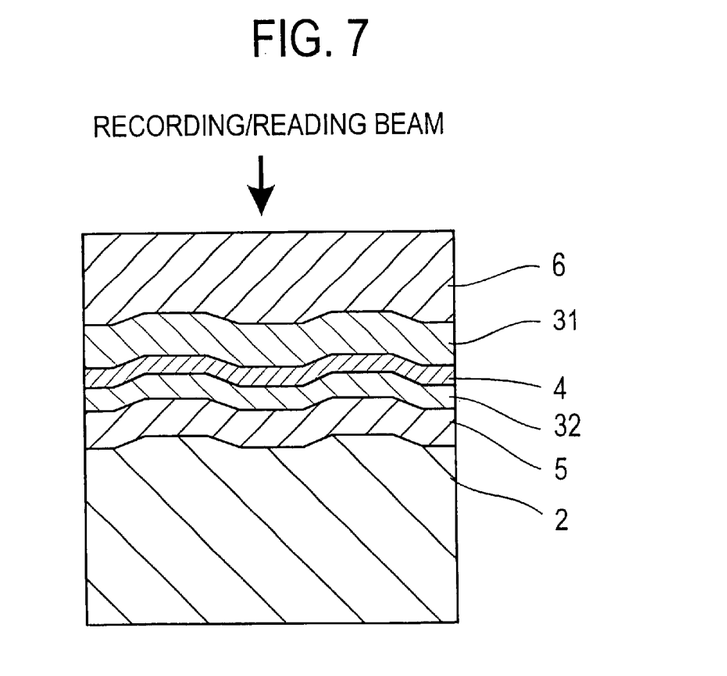
FIG. 7 is a cross sectional view of the optical recording medium according to another embodiment of the present invention.

The optical recording medium of the present invention may also have a constitution shown in FIG. 7. In the case of such constitution, the recording/reading beam is irradiated without passing through the substrate 2, and in this case, the reflective layer 5, the second dielectric layer 32, the recording layer 4, the first dielectric layer 31, and the protective layer 6 are stack on the substrate 2 in this order.

Figure 8:
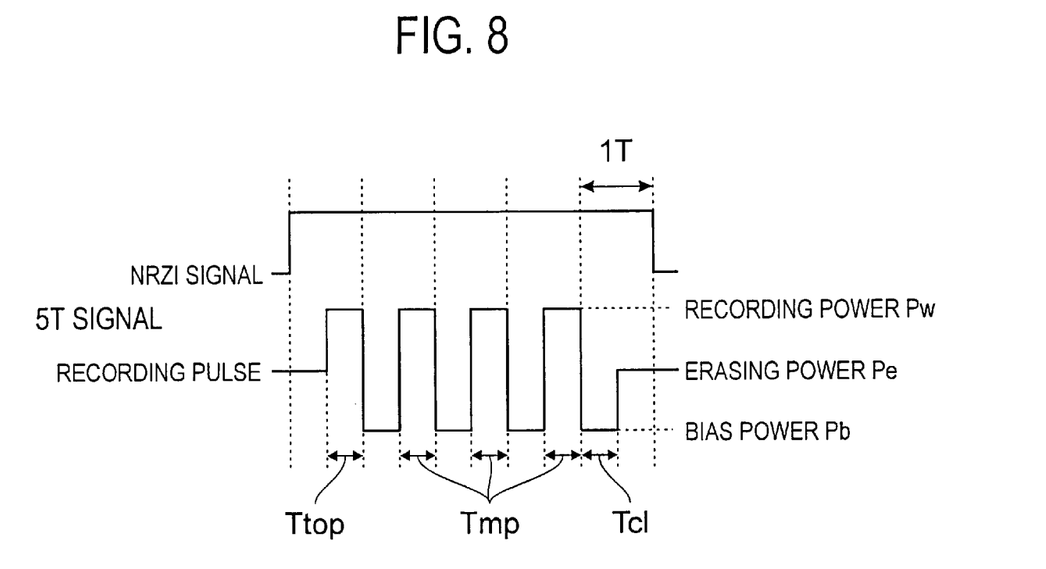
FIG. 8 is a schematic view showing an embodiment of the recording pulse strategy.

As described above, the writing of the optical recording medium of the present invention is conducted by selecting an appropriate recording pulse strategy. The recording pulse strategy is described hereinbelow. An optical recording medium of phase change type is generally recorded, not by continuously irradiating the medium with the beam of the recording power for the duration corresponding to the length of the record mark, but by irradiating the medium by with the beam divided in a pulse train comprising a plurality of pulses for the control of the record marks as described in JP-A 7176/1997. Constitution of the pulse division is generally referred to as the recording pulse strategy. An embodiment of the recording pulse strategy is shown in FIG. 8 wherein a typical recording pulse train corresponding to 5T signal of NRZI signal is illustrated. In FIG. 8, $T_{top}$ represents width of the top pulse, $T_{mp}$ represents width of the pulses other than the top pulse (which are also referred to as multi-pulse), and $T_{cl}$ represents width of the downward pulse (also referred to as the cooling pulse) after the last pulse. Such pulse width is generally indicated by the value normalized with standard clock width (1T). In the recording pulse strategy shown in FIG. 8, power (bias power $P_b$) of all of the downward pulses including the cooling pulse is set at a value lower than the erasing power $P_e$.

EXAMPLES

Experiment 1

A substrate in the form of a disk having a diameter of 120 mm and a thickness of 0.6 mm was prepared by injection molding polycarbonate. Grooves were simultaneously formed in the injection molding of the substrate. On the grooved surface of the substrate, there were formed a first dielectric layer, a recording layer, a second dielectric layer, and a reflective layer in this order to produce optical recording disk samples having Ag—In—Sb—Te based recording layer.

The first dielectric layer was formed by sputtering in argon atmosphere using ZnS (80 mole %)—SiO$_2$ (20 mole %) for the target. The first dielectric layer was formed to a thickness of 80 nm.

The recording layer was prepared by sputtering in argon atmosphere using Ag—In—Sb—Te alloy for the target. The recording layer had the composition:

$$(Ag_a In_b Sb_c Te_d)_{(1-e/100)} Ge_e \qquad (I)$$

wherein
a=6.78,
b=4.57,
c=59.36,
d=29.29, and
e=0.

The recording layer was formed to a thickness of 23 nm.

The second dielectric layer was formed by sputtering in argon atmosphere using ZnS (80 mole %)—SiO$_2$ (20 mole %) for the target. The second dielectric layer was formed to a thickness of 25 nm.

The reflective layer was formed by sputtering in argon atmosphere using Al—1.7 mole % Cr for the target. The reflective layer was formed to a thickness of 100 nm.

A sample having a recording layer of Ge—Sb—Te system was produced for comparison purpose by the same procedure as the samples as described above except for the composition of the recording layer which was Ge$_2$Sb$_2$Te$_5$.

The recording layer of the samples was initialized (crystallized) on a bulk eraser, and the samples were recorded on an optical recording medium evaluator under the conditions:

laser beam wavelength: 635 nm, numerical aperture, NA: 0.6, linear velocity: 6 m/s, and recording signal: 8–16 modulated signal.

It should be noted that the linear velocity as indicated above is the one at which the jitter is minimized. The minimum mark length was 600 nm.

The samples were then stored in the environment of 80° C. and 80% RH, and the increase in jitter associated with the storage was evaluated. The results are shown in FIG. 1.

Figure 1:
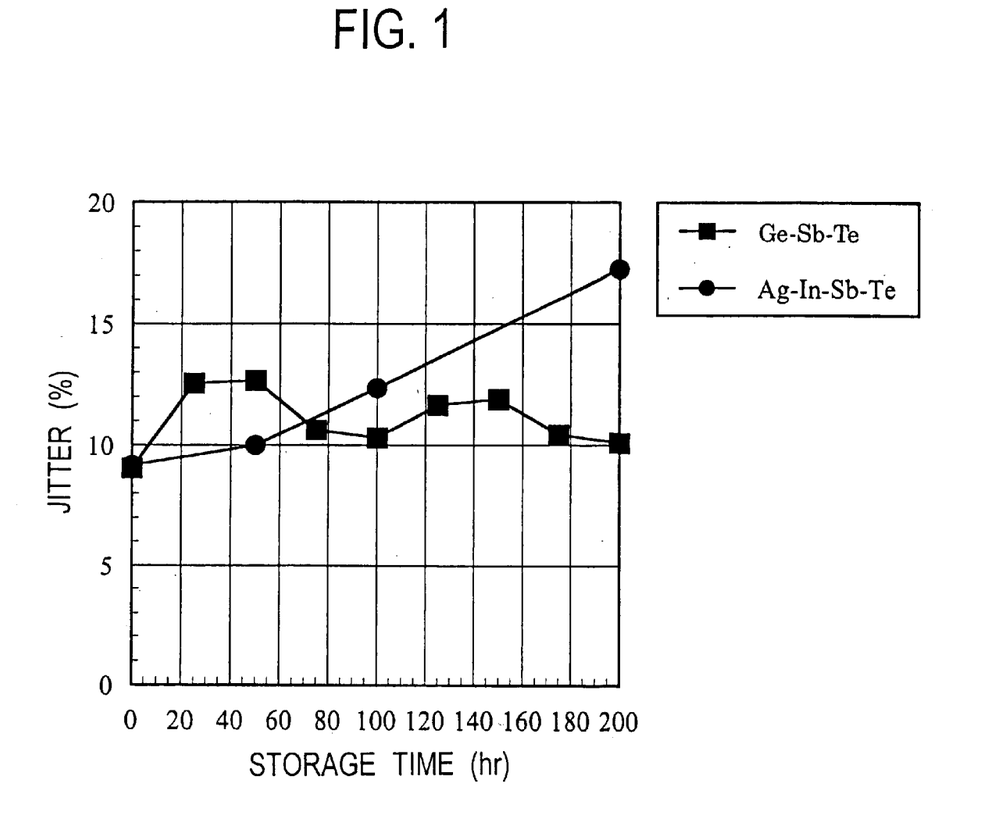
FIG. 1 is a graph showing jitter in relation to the storage time of the medium under high temperature, high humidity conditions.

As shown in FIG. 1, increase in the jitter with increase in the storage time was found in the sample of Ag—In—Sb—Te system. On the other hand, no significant increase in the jitter was found in the sample of Ge—Sb—Te system at least before the storage time of 200 hours. This result indicates the inferior high temperature reliability of the composition of Ag—In—Sb—Te system compared to the composition of Ge—Sb—Te system.

Experiment 2

Figure 2:
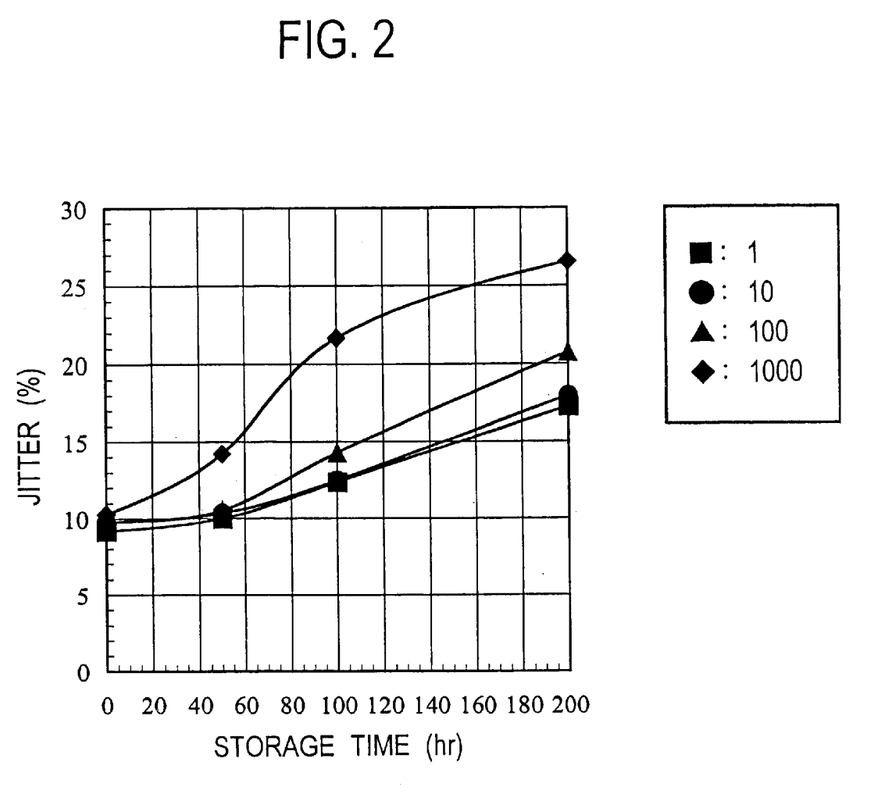
FIG. 2 is a graph showing jitter in relation to the storage time of the medium under high temperature, high humidity conditions.

The sample disks of Ag—In—Sb—Te system produced in Experiment 1 were subjected to various number of repeated overwriting operations under the same conditions as Experiment 1, and the disks were stored in the environment of 80° C. and 80% RH to evaluate the increase in jitter in relation to the storage time. The number of recording operations by overwriting was 10, 100 and 1000 times. The results are shown in FIG. 2. FIG. 2 also shows the result of Experiment 1 (wherein the recording was conducted once).

The results shown in FIG. 2 indicate that the high temperature reliability reduces with the increase in the number of overwriting operations.

Experiment 3

Samples of optical recording disks were produced by repeating the procedure of Experiment 1 except that the composition of the recording layer represented by the formula (I) was changed to the compositions as described below in Nos. 1 to 5.

Composition No. 1
  a=6.74,
  b=4.39,
  c=60.63,
  d=28.24, and
  e=0
Composition No. 2
  a=5.91,
  b=4.09,
  c=63.91,
  d=26.09, and
  e=1.93
Composition No. 3
  a=6.01,
  b=3.75,
  c=66.15,
  d=24.09, and
  e=5.37
Composition No. 4
  a=5.09,
  b=3.34,
  c=70.36,
  d=21.21,
  e=10.72
Composition No. 5
  a=3.56,
  b=2.35,
  c=79.00,
  d=15.09, and
  e=16.66

It should be noted that Sb content was increased in these compositions in correspondence with the increase in Ge content in order to substantially match the linear velocity at which the jitter is minimized.

These samples were subjected to overwriting operations (number of recording: 10) under the conditions the same as those of Example 1 except for the linear velocity which was increased to 8 m/s and the clock frequency. The linear velocity used was the one at which the jitter was substantially minimized in each sample. The minimum mark length was 400 nm. After the overwriting, the samples were stored in the environment of 80° C. and 80% RH to evaluate the increase in jitter in relation to the storage time. The results are shown in FIG. 3.

Figure 3:
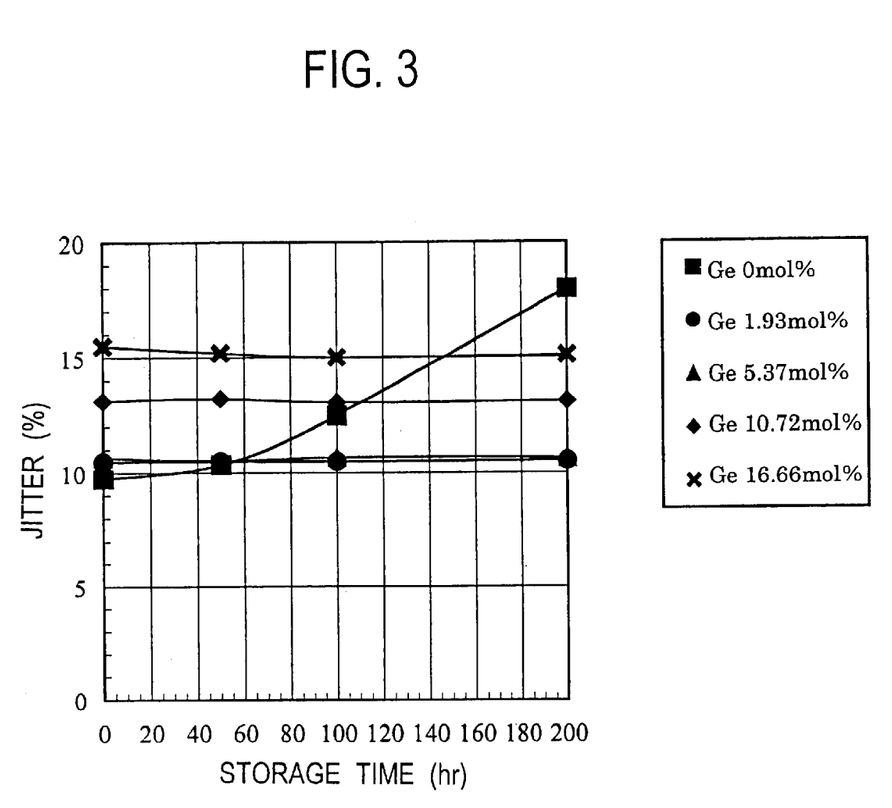
FIG. 3 is a graph showing jitter in relation to the storage time of the medium under high temperature, high humidity conditions.

As demonstrated in FIG. 3, increase in jitter caused by the storage at a high temperature was suppressed by the addition of Ge while increase in the Ge content resulted in the increase of initial jitter.

Experiment 4

Figure 4A:
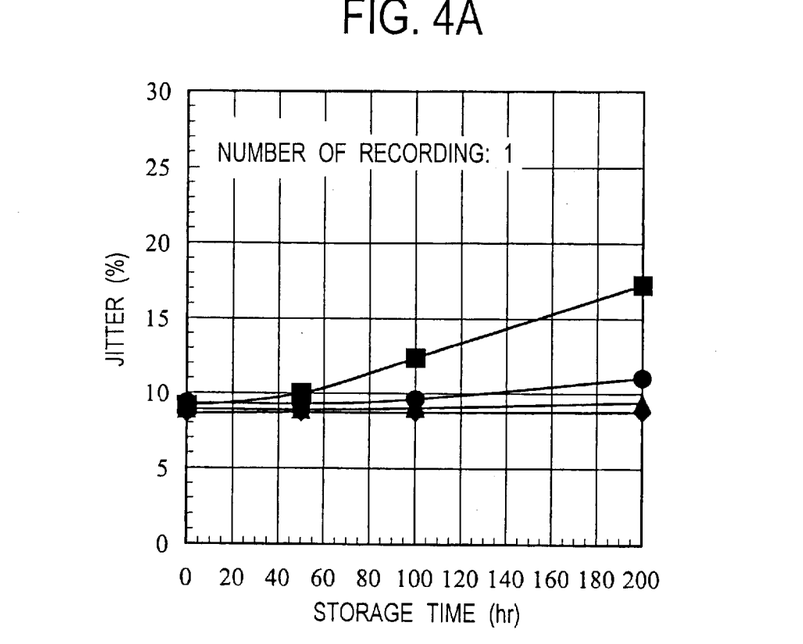
FIGS. 4A and 4B are respectively graphs showing jitter in relation to the storage time of the medium under high temperature, high humidity conditions.
Figure 4B:
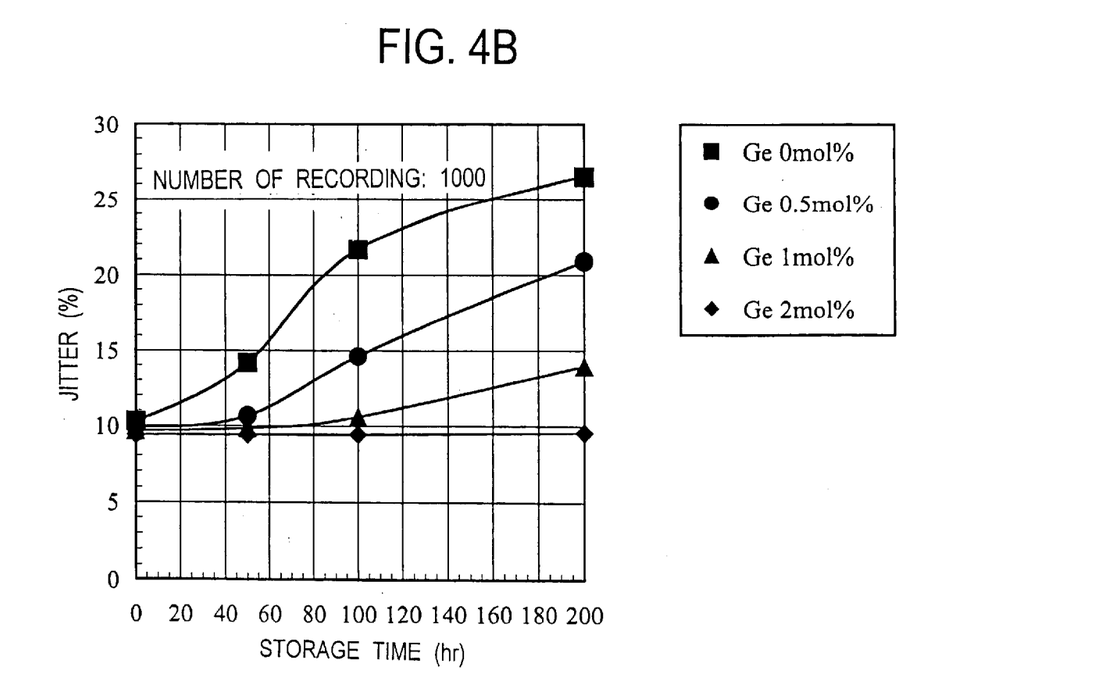

Samples of optical recording disks were produced by repeating the procedure of Experiment 1 except that the Ge content expressed by "e" in formula (I) was changed among 0, 0.5, 1, or 2. These samples were subjected to recording for once or overwriting operations (number of recording: 1000) under the conditions the same as those of Experiment 1. After the recording, the samples were stored in the environment of 80° C. and 80% RH to evaluate increase in the jitter in relation to the storage time. FIG. 4A shows the results when the samples were recorded once, and FIG. 4B shows the results when the samples were overwritten.

As demonstrated in FIG. 4A, high temperature reliability of sufficient level is attained when the Ge content is at least 1 mole % when the sample disks is to be recorded once. On the other hand, a Ge content of at least 2 mole % is required when the high temperature reliability of sufficient level is to be established when the disk is to be repeatedly overwritten.

Experiment 5

Samples of optical recording disks were produced by repeating the procedure of Experiment 1 except that the composition of the recording layer represented by the formula (II):

$$(Ag_a In_b Sb_c Te_d)_{(1-e/100)} M_e \qquad (II)$$

was changed to the composition as described below in Nos. 6 to 8.

Composition No. 6
  M=Si,
  a=6.77,
  b=3.68,
  c=66.66,
  d=22.89, and
  e=7.56
Composition No. 7
  M=Ge,
  a=6.75,
  b=3.94,
  c=68.41,
  d=20.90, and
  e=5.21
Composition No. 8
  M=Sn,
  a=7.60,
  b=3.88,
  c=65.60,
  d=22.92, and
  e=6.24

These samples were subjected to overwriting operations (number of recording: 10) under the conditions the same as those of Example 1 except for the linear velocity which was increased to 10 m/s and the clock frequency. The linear velocity used was the one at which the jitter was substantially minimized in each sample. The minimum mark length was 400 nm. After the overwriting, the samples were stored in the environment of 80° C. and 80% RH to evaluate the increase in jitter in relation to the storage time. The results are shown in FIG. 5.

Figure 5:
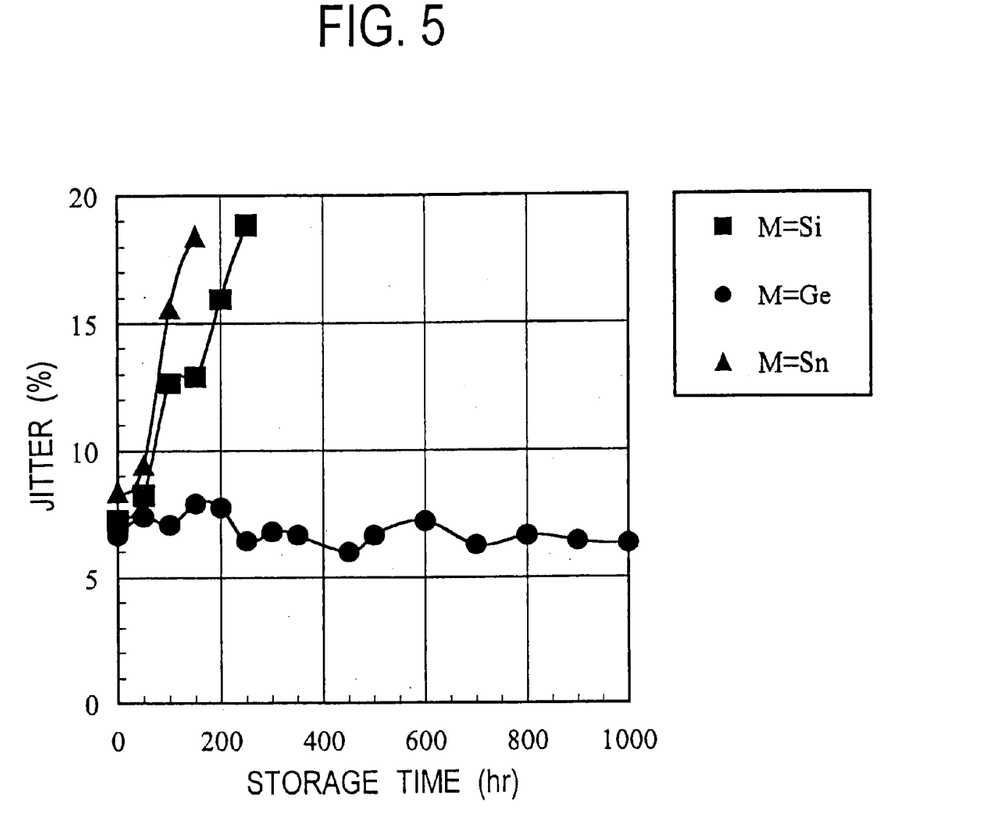
FIG. 5 is a graph showing jitter in relation to the storage time of the medium under high temperature, high humidity conditions.

As demonstrated in FIG. 5, of the Si, Ge, and Sn added, only Ge showed the effect of improving the high temperature reliability.

Experiment 6

Samples for evaluation were produced by repeating the procedure of Experiment 1 except that a slide glass was used for the substrate and the Ge content shown in Table 1 was used. It should be noted that the molar ratio of the main components in the recording layer was the same as that of Experiment 1.

Each sample was evaluated for crystallization temperature of the recording layer by placing the sample on the heating stage for heating at a rate of 30° C./min and illuminating the recording layer with the light directed through the substrate to thereby determine the temperature of reflectivity change. Also determined was the time required for the crystallization at the temperatures of $0.95T_c$, $0.96T_c$, $0.97T_c$, $0.98T_c$, and $0.99T_c$ when the crystallization temperature was $T_c$ (unit, K) by maintaining the temperature of the sample at each temperature. The activation energy of the recording layer was calculated by Arrhenius method from the thus obtained results. The crystallization temperature and the activation energy of the samples are shown in Table 1.

TABLE 1

| Ge content (mole %) | Crystallization Temp. (° C.) | Activation energy (eV) |
|---|---|---|
| 0 | 175.5 | 3.15 |
| 2 | 185 | 3.41 |
| 5 | 201 | 4.59 |
| 10 | 231 | 4.95 |

The results shown in Table 1 demonstrate that the crystallization temperature and the activation energy are improved by the addition of Ge as the sub-component.

Japanese Patent Application No. 009461/2000 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording medium having a recording layer of phase change type, wherein said recording layer contains Ag, In, Sb, and Te as its main components, and Ge as its sub-component such that, when molar ratio of the elements constituting the main and sub-components is represented by formula (I):

$$(Ag_a In_b Sb_c Te_d)_{(1-e/100)} Ge_e \qquad (I)$$

$2 \leq a \leq 20$, $2 \leq b \leq 20$, $35 \leq c \leq 80$, $8 \leq d \leq 40$, $a+b+c+d=100$, and $1 \leq e \leq 15$.

2. The optical recording medium according to claim 1 wherein $e \geq 1.8$.

3. The optical recording medium according to claim 1 wherein $e \leq 8$.

4. The optical recording medium according to claim 1 wherein $58 \leq c \leq 80$.

* * * * *